US012616642B2

(12) United States Patent
Bollinger et al.

(10) Patent No.: US 12,616,642 B2
(45) Date of Patent: May 5, 2026

(54) CURVED BLOOD CASSETTE SYSTEM

(71) Applicant: Cryoport, Inc., Brentwood, TN (US)

(72) Inventors: Bret Bollinger, Yorba Linda, CA (US); Ben Lee, Corona, CA (US)

(73) Assignee: Cryoport, Inc., Brentwood, TN (US)

( * ) Notice: Subject to any disclaimer, the term of this patent is extended or adjusted under 35 U.S.C. 154(b) by 0 days.

(21) Appl. No.: 18/221,215

(22) Filed: Jul. 12, 2023

(65) Prior Publication Data

US 2025/0017822 A1 Jan. 16, 2025

(51) Int. Cl.
*A61J 1/16* (2023.01)
*A61J 1/12* (2006.01)
*A61J 1/14* (2023.01)

(52) U.S. Cl.
CPC ................ *A61J 1/165* (2013.01); *A61J 1/12* (2013.01); *A61J 1/1493* (2013.01); *A61J 2200/44* (2013.01)

(58) Field of Classification Search
CPC ...... A61J 1/16; A61J 1/165; A61J 1/10; A61J 1/12; A61J 1/1493; A61J 2200/44; A61M 1/0213; A61M 1/0218
USPC ................................ 206/528, 535, 538, 204
See application file for complete search history.

(56) References Cited

U.S. PATENT DOCUMENTS

2001/0050237 A1* 12/2001 Hacikyan ............ B65D 81/264 206/521
2012/0165176 A1* 6/2012 Andou ................ A61M 1/3693 210/450
2018/0036202 A1* 2/2018 Wengreen ............ A61M 5/002

FOREIGN PATENT DOCUMENTS

GB 2553536 * 3/2018

* cited by examiner

*Primary Examiner* — Rafael A Ortiz
(74) *Attorney, Agent, or Firm* — Snell & Wilmer L.L.P.

(57) ABSTRACT

A cylindrical container for holding one or more articles, such as blood bags. The cylindrical container may hold multiple curved article containers comprising the one or more articles arranged in a circle. The cylindrical holding container may embody a carousel shape for easy access to the curved article containers. The ends of the multiple curved article containers may overlap each other to nest into the cylindrical holding container. The cylindrical holding containers may be stackable. The cylindrical holding container may be placed in a cryogenic shipper or dewar, to secure and stabilize the articles within during transport.

15 Claims, 6 Drawing Sheets

CURVED BLOOD CASSETTE SYSTEM

FIELD

This specification relates to a system, device or apparatus for cryogenically storing, transporting and/or shipping a liquid, such as blood, under cryogenic temperatures.

DESCRIPTION OF THE RELATED ART

Medical practitioners or professions may need to transport and store blood bags or other medical related articles at cold or even cryogenic temperatures. Commonly, these articles may be shipped or stored in cryogenic storage containers, such as dewars. The blood bags or other articles are commonly housed in frames, sometimes called "cassettes," to hold the articles in place and carry multiple articles during shipment. Often metal cases or cassettes are used which stack multiple articles in a larger frame. The cassette stacking systems for shipping and storing blood bags and other articles comes with several issues.

For example, in order to transport blood bags at cryogenic temperatures, metal cassettes for housing each of the blood bags, frames for holding multiple cassettes, frame dividers, as well as other secondary containment containers can be used. These items often use a great amount of space allocated for shipping blood bags. Further each of these items must be individually cleaned inventoried, cleaned, and maintained after each shipment.

Further, in cassette and other metal storage systems, stacking of blood bags closely together may cause uneven cooling and storage at cryogenic temperatures, as some articles may be further in distance to the cooling materials. Additionally, during transport the blood bag cassette or storage holders do not fully protect the blood bags from shocks and vibrations. The blood bags may move or shake in transport as the current blood bag holding systems do not provide a secure environment to the prevent blood bags from damage during storage and transportation. Further, the blood bag cassettes make it difficult to identify and access the blood bags without unloading the entire contents of the cassette.

Accordingly, there is a need for a system, device or apparatus to carry a plurality of articles, such as blood bags, that is more secure, more efficiently shaped, and easier to load and access individual blood bags.

SUMMARY

A holding container device is disclosed herein. In various embodiments, the holding container device comprises a holding container axis. The holding container may further comprise a plurality of curved article containers each comprising a first end and a second end, wherein the first end is positioned closer to the holding container axis than the second end. The holding container device may further comprise a main body, wherein each of the plurality of curved article containers are configured to removably attach to the main body.

A stackable article holding system is disclosed herein. In various embodiments, the stackable article holding system may comprise a plurality of holding containers. The plurality of holding containers may comprise a holding container axis, and a plurality of curved article containers. In various embodiments, each of the curved article containers may comprise a first end and a second end. The first end may be positioned closer to the holding container axis than the second end. The plurality of holding containers may be configured to vertically stack.

A method of stacking curved article containers is disclosed herein. In various embodiments, the method may include inserting an article into each of a plurality of curved article containers. The plurality of curved article containers may each have a first end and a second end. The method may include attaching the plurality of curved article containers to each of a plurality of holding containers. Each of the plurality of holding containers may comprise a holding container axis. The first end of each of the plurality of curved article containers may be positioned closer to the holding container axis than the second end of each of the plurality of curved article containers. The method may include stacking the plurality of holding containers.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

Figure 1A:
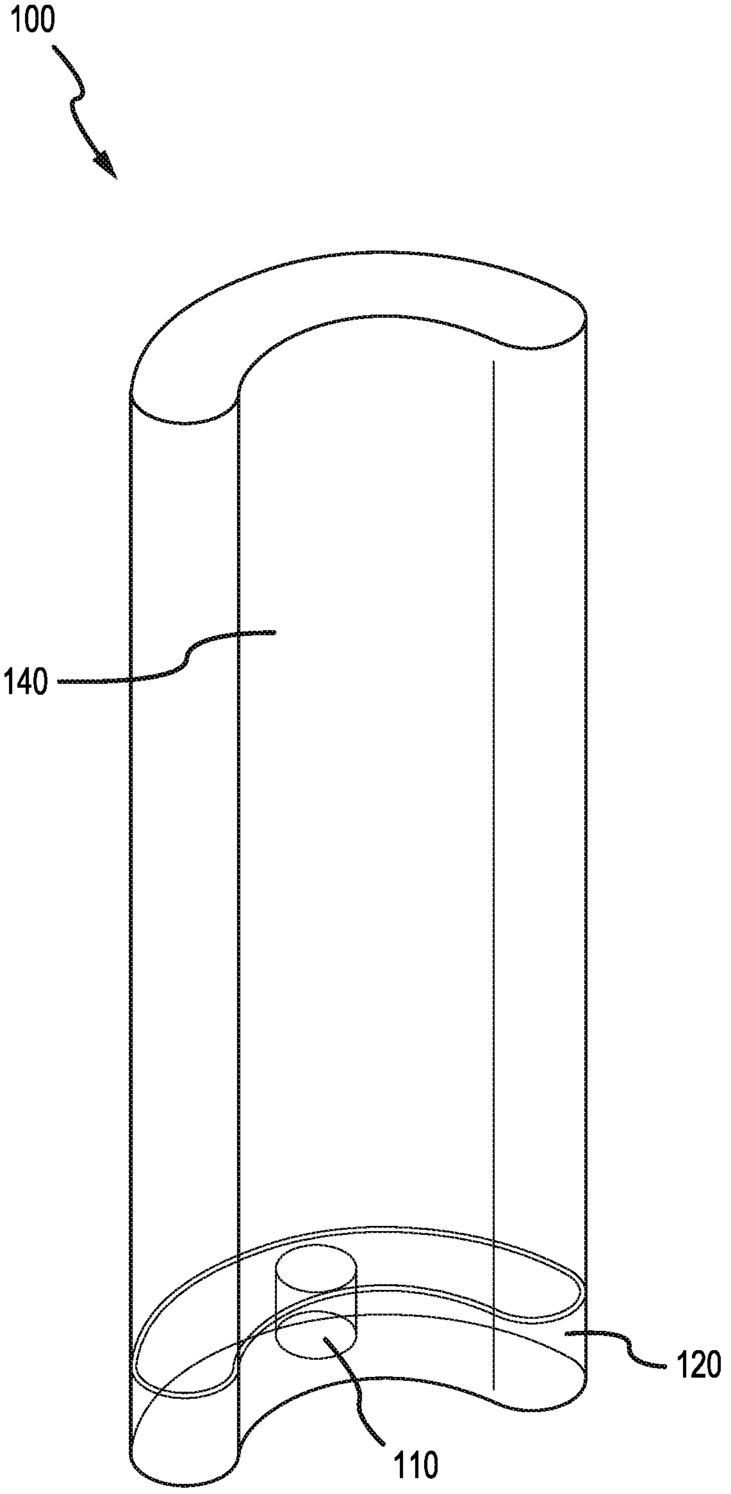
FIG. 1A illustrates a side view of a curved article container, in accordance with various embodiments.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

DETAILED DESCRIPTION

Disclosed herein are systems, apparatuses and devices for transporting and storing articles, such as a blood bags. The system, apparatus or device may include a plurality of curved article containers that stores and transports a plurality of articles (such as blood bags) (e.g., each container in the plurality of curved article containers holds at least one blood bag). Particular embodiments of the subject matter described in this specification may be implemented to realize one or more of the following advantages.

In various embodiments, blood bags may be stored in curved article containers. These curved article containers may also be referred to herein as "cassettes" or "blood cassettes." Various articles may be stored in the curved article containers, including industry used standard or "offthe-shelf" blood bags, specialized blood bags, and/or other articles, such as different biomaterials, fragile objects or substances, and the like.

With reference to FIG. 1A, a side view of a curved article container 100 is illustrated, in accordance with various embodiments. The curved article container 100 comprises a filter 110, an article container cap 120, and a container body 140. The filter 110 may be connected to the article container cap 120. The article container cap 120 may be configured to attach to the container body 140. The article container cap 120 may be removed from the container body 140 to allow an article, such as a blood bag, to be inserted or removed. The container body 140 may be transparent to allow a user to see an identification label of the article or the article itself.

The curved article container 100 may be configured to house an article, such as a blood bag. In various embodiments, the curved article containers 100 may provide protection between the article and the external environment. The curved article container 100 may further comprise absorbent materials configured to absorb the contents of the article stored in the curved article container 100. The absorbent materials may be an absorbent sheet or layer inside the container body 140.

In various embodiments, all or a portion of the curved article container 100 can be made from a variety of different materials. For example, curved article container 100 can be made of metal, wood, plastic, ceramic, and/or some other rigid or semi-rigid material. In various embodiments, elements of the curved article container 100 can be made from a thermal insulating and/or thermal conducting material.

The curved article container 100 may be configured to provide protection to the article and reduce the effects of a damaged article, as the extra enclosure will help seal the contents and reduce leakage.

Figure 1B:
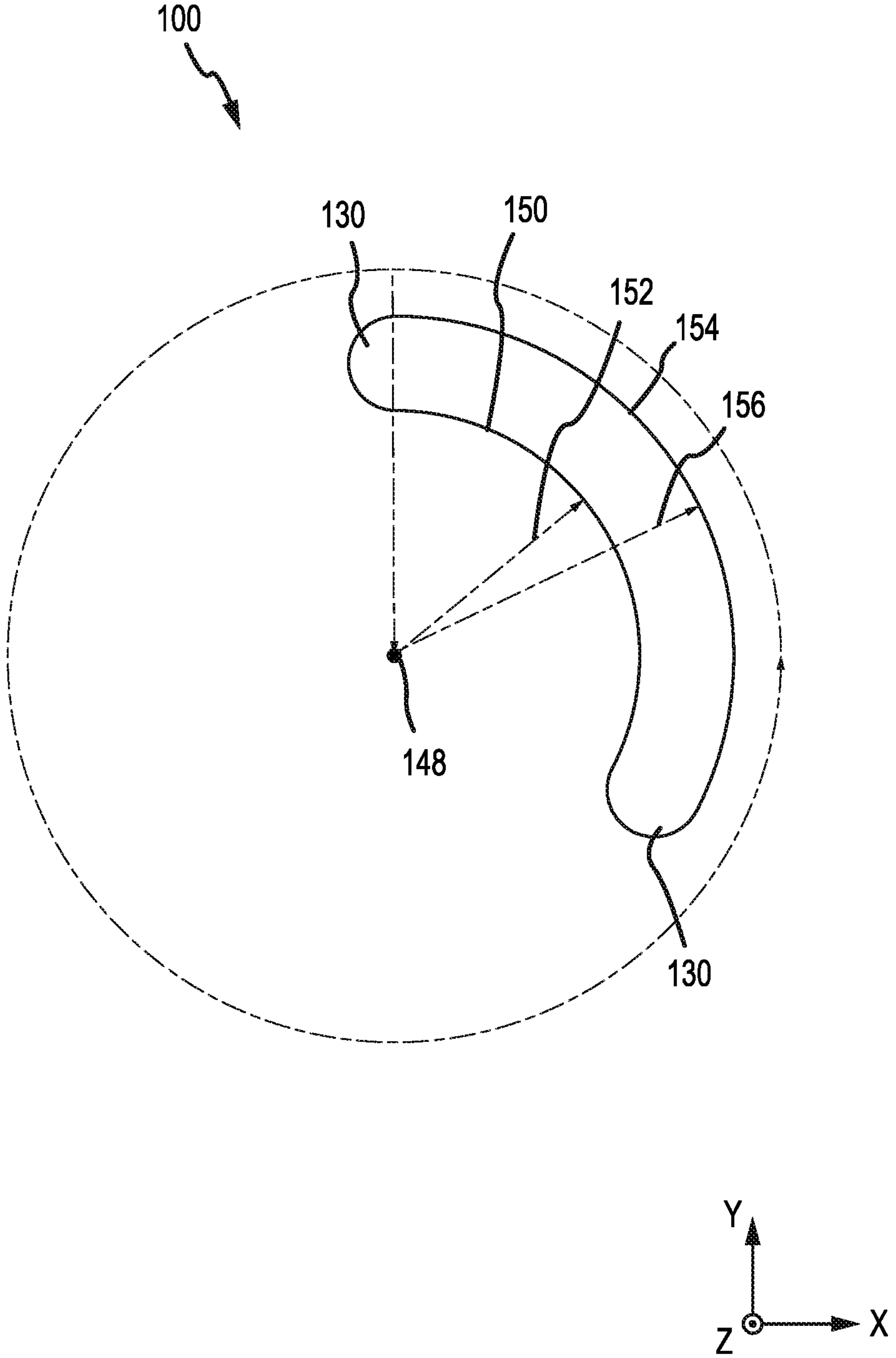
FIG. 1B illustrates a top down view of a curved article container, in accordance with various embodiments.

With reference to FIG. 1B, a top down view of a curved article container 100 is illustrated, in accordance with various embodiments. The curved article container 100 comprises an inner wall 150, an outer wall 154, and two ends 130. In various embodiments, the two ends 130 may be rounded ends.

Figure 2A:
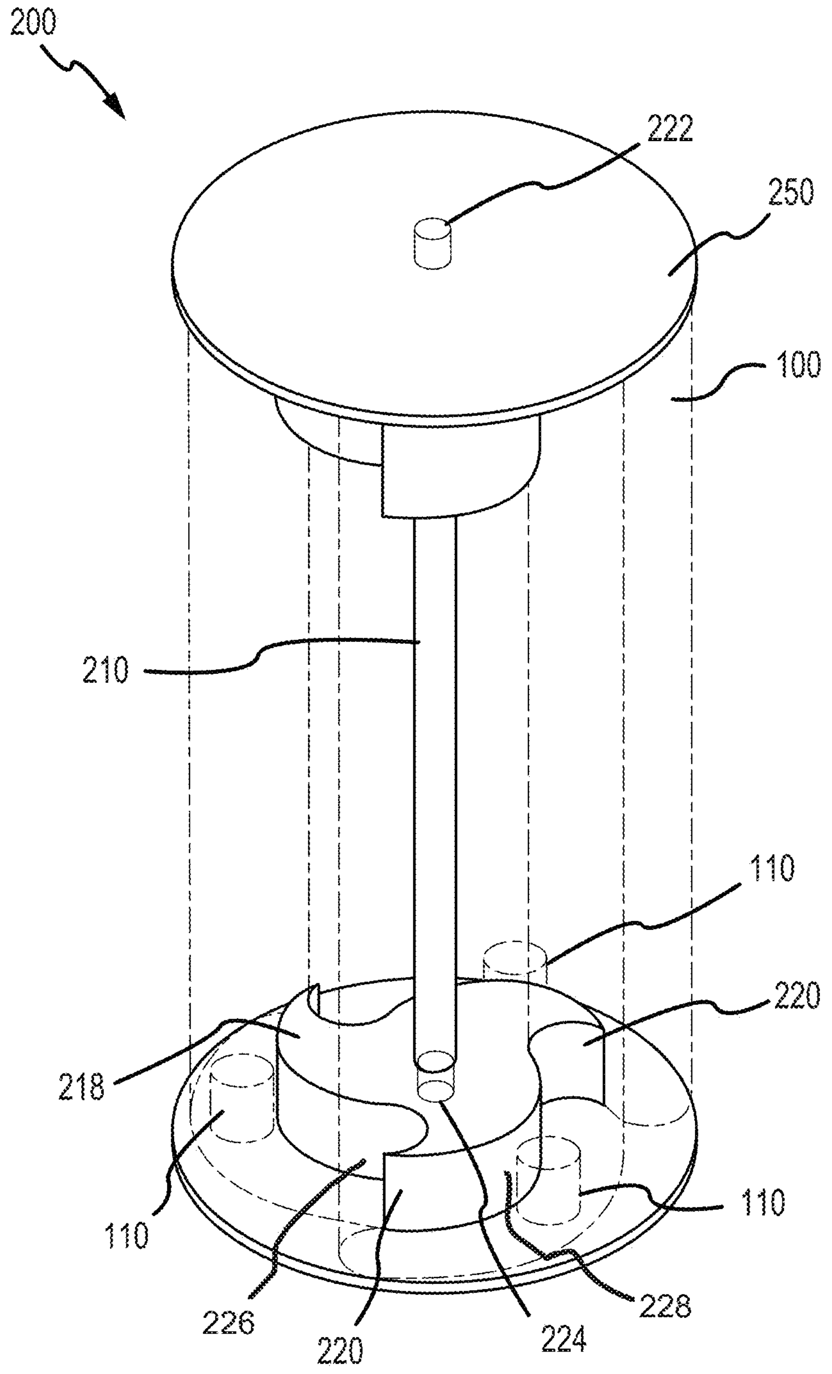
FIG. 2A illustrates a side view of a holding container for holding one or more curved article containers, in accordance with various embodiments.
Figure 2B:
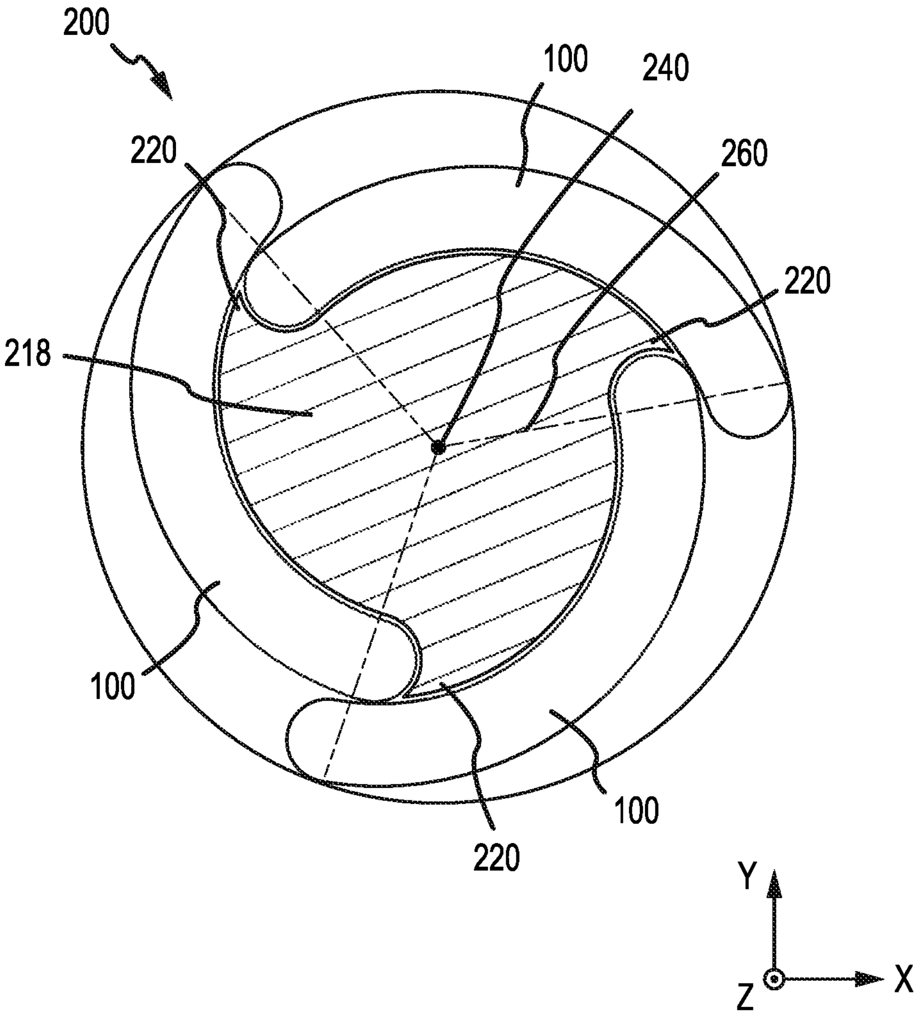
FIG. 2B illustrates of a top down view of a holding container for holding one or more curved article containers, in accordance with various embodiments.

The curved article container 100 may be curved and configured to fit into a holding container, as shown in FIGS. 2A and 2B and described below. The holding container 200 may, in various embodiments have a diameter of roughly three (3) inches (e.g., about 7.6 cm). In various embodiments, the diameter of the holding container 200 may have a diameter smaller or greater than three (3) inches (e.g., about 7.6 cm). In various embodiments, the holding container 200 may have a holding container radius 260 which is equal to half of the holding container diameter. In various embodiments, the holding container radius 260 is about 1.5 inches (e.g., about 3.8 cm). The curved article container 100 may be at least partially curved around a curved container axis 148 (FIG. 1B), wherein the inner wall 150 (FIG. 1B) is curved to an inner wall radius 152 (FIG. 1B). Further, in various embodiments, the outer wall 154 (FIG. 1B) may be curved to an outer wall radius 156 (FIG. 1B). In various embodiments, the outer wall radius 156 (FIG. 1B) may be greater than the inner wall radius 152 (FIG. 1B). For example, curved article container 100 (FIG. 1B) may be curved so that the width is constant as measured from the curved container axis 148 (FIG. 1B). In various embodiments, the outer wall radius 156 (FIG. 1B) may be less than the holding container radius 260.

With reference now to FIGS. 2A and 2B, a side view and top down view of a holding container 200 are illustrated, in accordance with various embodiments. The holding container 200 may comprise one or more curved article containers 100. In various embodiments, the curved article containers 100 may be removably attached to the holding container 200. For example, as shown in FIGS. 2A and 2B, the holding container 200 may be configured to hold three curved article containers 100. In various embodiments, the holding container 200 may be configured to hold more or less than three curved article containers 100. In many embodiments, the holding container 200 may be a cylinder shape, such as a tube shaped structure. With reference to FIG. 2A, a perspective view of a holding container 200 is shown, wherein the curved article containers 100 are shown with dotted lines. With reference to FIG. 2B, a top down view of the holding container 200 is shown, wherein the holding apparatus 218 is denoted using solid diagonal lines.

With reference back to FIGS. 2A and 2B, in various embodiments, the holding container 200 may comprise a main body 210. The main body 210 may be configured to hold a plurality of curved article containers 100. In various embodiments, the main body 210 may comprise one or more holding apparatuses 218 (also called, connection element 218). The holding apparatus 218 may be used to hold the one or more curved article containers 100 in place. In further embodiments, the holding apparatus may be a plurality of gripping troughs 226. In further embodiments, the holding apparatus 218 may comprise a flange 220 (also called, a gripping member 220) to hold the curved article container 100. For example, the flange 220 of the holding apparatus 218 may clasp or wrap around an end 130 of the curved article container 100, to hold the curved article container at least partially to the holding container 200. In various embodiments, each curved article container 100 may be held in place by a flange 220 on one end 130. In various embodiments, the flange 220 may be curved like a half moon to hold the curved article container 100 in place, including, for example, on its open face 228 of the half moon shape. The main body 210 may comprise one or more holding apparatuses 218 having one or more flanges 220 on each holding apparatus 218, wherein each flange 220 is configured to hold an end 130 of a curved article container 100.

In various embodiments, each of the one or more curved article containers 100 may be removably attached to the holding container 200, such that each curved article containers 100 may be individually removed. For example, each of the curved article container 100 may be removed from the holding container 200, without the need to remove any other of the curved article containers 100.

In various embodiments, the holding container 200 may comprise two holding apparatuses 218. For example, a first holding apparatus 218 may be located at the top of the main body 210 and a second holding apparatus 218 may be located at the bottom of the main body 210. In various embodiments, the holding apparatus 218 may extend the height of the main body 210.

In various embodiments, the main body 210 may comprise a holding container cap 250. The main body 210 may have a holding container cap 250 connected to the top and bottom of the holding container 200. In various embodiments, one or more of the holding container caps 250 may be removably attached. In many embodiments, one or more of the holding container caps 250 may be configured to connect with filter 110. For example, the one or more of the holding container caps 250 may comprise a filter connector to connect to and/or seal or partially seal the filter 110 when the curved article container 100 is stored in the holding container 200. In some embodiments, the holding apparatus 218 may be attached to the holding container cap 250. In various embodiments, the holding apparatus 218 and holding container cap 250 may be one piece.

Figure 3:
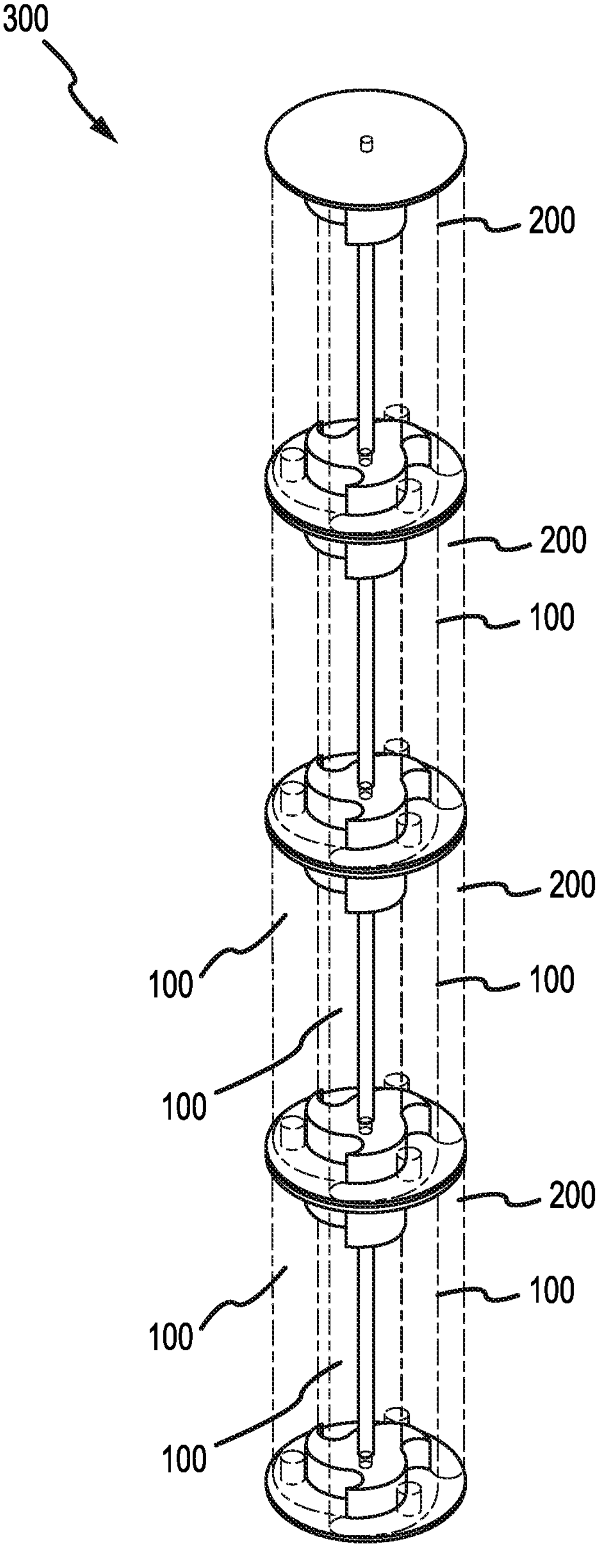
FIG. 3 illustrates a stackable assembly for holding containers, in accordance with various embodiments.

In various embodiments, the holding container 200 may comprise a post 222. The post 222, in various embodiments, may be positioned in the center of the top of the holding container 200. The holding container 200 may comprise a post receiver 224. In various embodiments, the post receiver 224 may be configured to attach to a post 222. The post 222 and post receiver 224 may be used to stack the holding containers 200 (as shown in FIG. 3). In various embodiments, the post 222 may contain a keyhole, flange attachment, screw or other attachment means for attaching to the post receiver 224. For example, the post 222 may comprise a radial keyhole and the receiving post 224 may comprise a mating feature for connecting with the post 222. In various embodiments, the post 222 may be a portion of the main body 210 that extends through the holding container cap 250. In various embodiments, the post receiver 224 may be a portion of the holding container cap 250 into which a post 222 that is a portion of the main body 210 is receivable.

With reference to FIG. 2B, a top down view of the holding container 200 is illustrated, in accordance with various embodiments. The holding container 200 comprises a holding container axis 240. The holding container axis 240 may comprise a rod extending along an axis, such as a central axis of a holding container 200. In various embodiments, the holding container 200 is configured to hold a plurality of curved article containers 100 such that each of the curved article containers 100 are rotated in relation to the holding container axis 240.

With reference to FIG. 2B, the holding container 200 may comprise a holding container axis 240. The holding container axis 240 may be the axis extending vertically on the Z axis. The holding container axis 240 may be a rod extending vertically on the Z axis. In various embodiments, each of two or more curved article containers 100 may be configured to attach to the holding container 200 in an overlapping manner. In many embodiments, the two or more curved article containers, may be positioned to allow a smaller radius of the holding container 200. For example, a first end 130 of each of the curved article containers 100 may be closer to the holding container axis 240 than the second ends 130 of each of the curved article containers 100.

In some embodiments, the curved article containers 100 may be removably attached to a holding container 200, such that multiple curved article containers 100 may be stored in a holding container 200. The curved article containers 100 may be positioned in the holding container 200 in an overlapping manner to reduce their storage space in the holding container 200. For example, in various embodiments, a holding container 200, which is roughly three (3) inches (e.g., about 7.6 cm) in diameter, may be configured to hold three (3) curved article containers 100, such that each curved article container 100 may be individually removed without the need to remove other curved article containers 100. This is a significant improvement over existing “stacked” article holding containers, where a cassette holder comprising multiple holding containers requires that multiple cassettes be removed to access other cassettes. In various embodiments, the diameter of the holding container 100 may have a diameter smaller or greater than three (3) inches (e.g., about 7.6 cm), wherein holding container 100 may be configured to hold (3) three or more curved article containers 100. It is to be appreciated that the size of the holding container 100 may vary based on the size of the curved article container 100. However, in various embodiments, the holding containers 200 may be of a diameter to fit a plurality of curved article containers 100.

With reference to FIG. 3, a stackable assembly 300 for holding containers is illustrated, in accordance with various embodiments. The stackable assembly 300 may be a stackable article holding system for stacking one or more holding containers 200. In various embodiments, the stackable assembly 300 may comprise two or more holding containers 200 stacked on top of each other vertically. In various embodiments, the holding containers 200 may be removably attached to additional holding containers 200 to stack on top of each other. In various embodiments, the post 222 and post receiver 224 may be used to stack the holding containers 200. For example, the post 222 may be inserted into the post receiver 224 to stack and prevent movement between the holding containers 200.

In various embodiments, the stackable assembly 300 may be configured to fit in a cryogenic storage container, such as a dewar. The stackable assembly 300 may be configured to fit inside the opening of a dewar. For example, a standard 4-liter dewar may be configured to hold four (4) holding containers 200 stacked on top of each other. In various embodiments, a dewar less than four liters may be used to hold one holding container 200.

Figure 4:
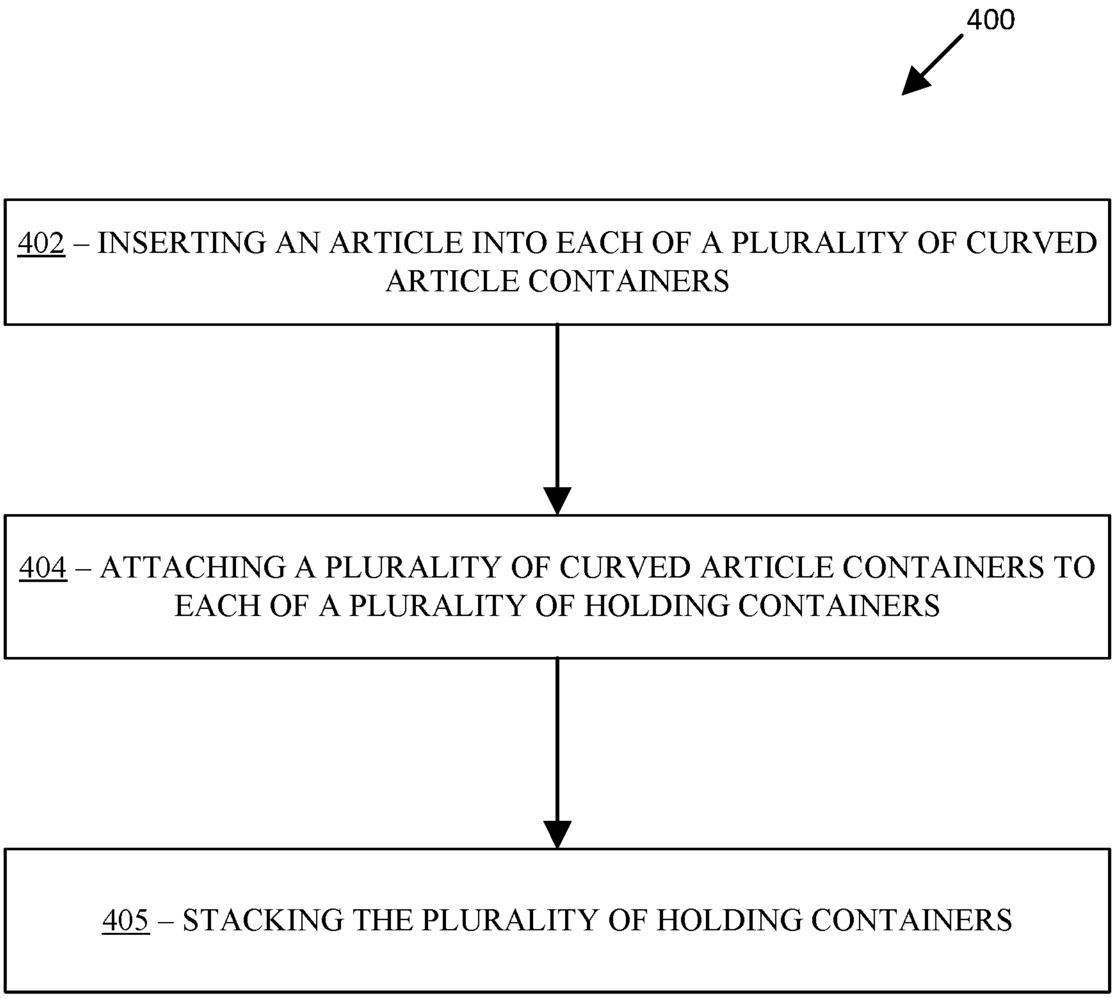
FIG. 4 illustrates a method of stacking curved article containers, in accordance with various embodiments.

With reference to FIG. 4, a method 400 of stacking curved article containers, in accordance with various embodiments, is illustrated. This method 400 may include inserting an article into each of a plurality of curved article containers (step 402). In various embodiments, the plurality of curved article containers may have a first end and a second end. The method 400 may further include attaching a plurality of curved article containers to each of a plurality of holding containers (step 404). In various embodiments, each of the plurality of holding containers may comprise a holding container axis. In various embodiments, each of the first ends of the plurality of curved article containers may be positioned closer to the holding container axis than each of the second ends of the plurality of curved article containers. The method 400 may further comprise stacking the plurality of holding containers (step 406).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents The terms “first,” “second,” “third,” “fourth,” and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms “include,” and “have,” and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Although curved article containers and their related methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1A-4 may be modified, and that the foregoing discussion of certain of these embodiments does not necessarily represent a complete description of all possible embodiments. For example, one or more of the elements of FIGS. 1A-B and 2A-B may include different structures and functions.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A holding container device comprising:

a holding container axis;

a plurality of article containers to contain a payload article within a chamber having a phase change material each comprising a first side and a second side, the first side and the second side being concentric relative to each other and joining together at a first end and at a second end opposite the first end, wherein the first end is positioned closer to the holding container axis than the second end;

and a connection element comprising a plurality of gripping members with an open face wherein the open face of the gripping members are configured to selectively retain the first end and one of the plurality of sides of each of the plurality of article containers so that each first end of each article container is nested between the open face and the second end of an adjacent article container.

2. The holding container device of claim 1, wherein the plurality of gripping members comprises one or more flanges, wherein each of the one or more flanges is shaped to retain a corresponding article containers to the holding container device.

3. The holding container device of claim 1, wherein the holding container device has a post member end and a post receiver end, wherein the post member end is configured to connect with the post receiver end of a second holding container device.

4. The holding container device of claim 1, wherein the plurality of curved article containers are configured to stably secure and protect a blood bag.

5. The holding container device of claim 1, wherein the connection element is semi-rigid.

6. The holding container device of claim 3, wherein post member end and post receiver end are removably attached to the holding container device.

7. A stackable article holding system comprising:

a plurality of holding containers, each respective holding container comprising:

a respective holding container axis; and a respective plurality of article containers to contain a payload article within a chamber having a phase change material, each respective article container of the respective holding container comprising a first side and a second side, the first side and the second side being concentric relative to each other and joining together at a first end and at a second end opposite the first end, wherein the respective first end is positioned closer to the respective holding container axis than the respective second end, and a connection element comprising a plurality of gripping members with an open face wherein the open face of the gripping members are configured to selectively retain the first end and one of the plurality of sides of each of the plurality of article containers so that each first end of each article container is nested between the open face and the second end of an adjacent article container wherein the plurality of holding containers is configured to vertically stack.

8. The system of claim 7, wherein the respective gripping member of the plurality of holding containers further comprises one or more flanges, wherein each of the one or more flanges is shaped to retain a corresponding article container to the holding container device.

9. The system of claim 7, wherein the holding container device has a post member end and a post receiver end, wherein the post member end is configured to connect with the post receiver end of a second holding container device.

10. The system of claim 7, wherein a respective curved article container of the respective plurality of curved article containers is configured to stably secure and protect a blood bag.

11. A method of stacking article containers comprising:

inserting an article into each of a plurality of article containers, wherein the plurality of article containers each have a first side and a second side, the first side and the second side being concentric relative to each other and joining together at a first end and at a second end opposite the first end and a connection element comprising a plurality of gripping members with an open face;

attaching the plurality of article containers to each of a plurality of holding containers, wherein each of the plurality of holding containers has a holding container axis, and wherein the first end of each of the plurality of curved article containers is positioned closer to the holding container axis than the second end of each of the plurality of curved article containers and each first end of each article container is nested between the open face and the second end of an adjacent article container and stacking the plurality of holding containers.

12. The method of claim 11, further comprising inserting the plurality of holding containers into a cryogenic storage container.

13. The method of claim 11, further comprising removing one or more of the plurality of curved article containers from one or more of the plurality of holding containers.

14. The method of claim 11, wherein the article is a blood bag.

15. A holding container device comprising:

a connection element comprising a plurality of gripping troughs with an open face along the perimeter;

a plurality of article containers to contain a payload article within a chamber having a phase change material, each comprising a first side and a second side, the first side and the second side being concentric relative to each other and joining together at a first end and at a second end opposite the first end, wherein the first end is positioned closer to the holding container axis than the second end wherein the first end of article containers are configured to partially engage with the gripping troughs and the second end of the article containers are configured to partially engage with the first end of a separate article container;

wherein the open face of the gripping troughs are configured to selectively retain the first end and one of the plurality of sides of each of the plurality of article containers.

* * * * *